United States Patent
Seth

(10) Patent No.: US 11,748,479 B2
(45) Date of Patent: Sep. 5, 2023

(54) CENTRALIZED PLATFORM FOR VALIDATION OF MACHINE LEARNING MODELS FOR ROBOTIC PROCESS AUTOMATION BEFORE DEPLOYMENT

(71) Applicant: UiPath, Inc., New York, NY (US)

(72) Inventor: Mohit Seth, Delhi (IN)

(73) Assignee: UiPath, Inc., New York, NY (US)

( * ) Notice: Subject to any disclaimer, the term of this patent is extended or adjusted under 35 U.S.C. 154(b) by 625 days.

(21) Appl. No.: 16/710,049

(22) Filed: Dec. 11, 2019

(65) Prior Publication Data
US 2021/0110035 A1  Apr. 15, 2021

(30) Foreign Application Priority Data
Oct. 15, 2019  (IN) .............. 201911041727

(51) Int. Cl.
| | |
|---|---|
| G06F 21/56 | (2013.01) |
| G06N 20/00 | (2019.01) |
| G06F 8/60 | (2018.01) |
| G06N 5/04 | (2023.01) |

(52) U.S. Cl.
CPC .............. G06F 21/565 (2013.01); G06F 8/60 (2013.01); G06N 5/04 (2013.01); G06N 20/00 (2019.01); *G06F 2221/033* (2013.01)

(58) Field of Classification Search
CPC .............. G06F 21/56–568; G06F 8/60; G06F 2221/033; G06N 5/04; G06N 20/00–20
See application file for complete search history.

(56) References Cited

U.S. PATENT DOCUMENTS

| | | |
|---|---|---|
| 9,503,466 B2 | 11/2016 | Vasseur et al. |
| 10,354,225 B2 | 7/2019 | Sharma et al. |
| 2015/0193697 A1 | 7/2015 | Vasseur et al. |
| 2016/0012350 A1 | 1/2016 | Narayanan et al. |
| 2017/0078336 A1 | 3/2017 | Aluvala et al. |
| 2017/0178020 A1 | 6/2017 | Duggan et al. |
| 2017/0228119 A1* | 8/2017 | Hosbettu ............... G06Q 10/00 |
| 2018/0060759 A1 | 3/2018 | Chu et al. |
| 2018/0197123 A1 | 7/2018 | Parimelazhagan et al. |

(Continued)

FOREIGN PATENT DOCUMENTS

| | | | |
|---|---|---|---|
| EP | 3467662 A1 | 4/2019 | |
| KR | 102010468 B1 | 8/2019 | |
| WO | WO-2021001845 A1 * | 1/2021 | ......... G06Q 10/0637 |

OTHER PUBLICATIONS

PEGA Community, "Tutorial: Uploading JAR files that contain models to Decision Data rules," available at https://community.pega.com/knowledgebase/articles/decision-management-overview/tutorial-uploading-jar-files-contain-models (last updated Oct. 31, 2018).

(Continued)

*Primary Examiner* — Matthew T Henning
(74) *Attorney, Agent, or Firm* — LeonardPatel PC; Michael A. Leonard, II; Sheetal S. Patel

(57) ABSTRACT

A centralized platform for validation of machine learning (ML) models for robotic process automation (RPA) before deployment is provided. The validation platform may support multiple programming languages and build platforms in a single centralized platform. The platform may allow the user to upload the model in a predefined package structure. The platform may then validate the package for deployment.

23 Claims, 7 Drawing Sheets

(56) References Cited

U.S. PATENT DOCUMENTS

| | | |
|---|---|---|
| 2018/0321918 A1 | 11/2018 | McClory et al. |
| 2019/0147371 A1 | 5/2019 | Deo et al. |
| 2019/0188070 A1 | 6/2019 | Das et al. |
| 2019/0332508 A1 | 10/2019 | Goyal et al. |
| 2020/0147791 A1 | 5/2020 | Safary et al. |
| 2020/0341970 A1 | 10/2020 | Rodrigues |
| 2020/0371782 A1* | 11/2020 | Baierlein ............ H04L 63/0807 |
| 2021/0339389 A1 | 11/2021 | Arcand et al. |

OTHER PUBLICATIONS

Chhian Ling, "Non-Final Office Action", dated Sep. 30, 2022, U.S. Appl. No. 16/710,027.

Chhian Ling, "Non-Final Office Action", dated Jun. 27, 2022, U.S. Appl. No. 16/710,027.

Chhian Ling, "Final Office Action", dated Feb. 9, 2023, U.S. Appl. No. 16/710,027.

"End-to-End Automation Enables Business Transformation," UiPath RebootWork (Oct. 21, 2019).

"Machine Learning (ML) for Robotic Process Automation (RPA)," IPCOM000259995D (Oct. 7, 2019).

Notice of Allowance issued in U.S. Appl. No. 16/710,027 dated Jul. 5, 2023.

Rose et al., "Combining Robotic Process Automation and Machine Learning," Deloitte and SAS (2019).

* cited by examiner

FIG. 6

Upload Model

Select or drop files *
SentimentAnalysis.zip

Please follow the link to know how to structure your zip file: AI Fabric's Documentation Model name *
TheBestSentimentAnalyzer Input description type *
json Input description
Provide the text to analyze as a String.
Example: "I'm so happy today!!!"

Output description
The model will return the detected sentiment along with a confidence score on the form of a json string.
Example: "{'sentiment': 'positive', 'confidence': 0.99}"

Language *
Python 3.x

Optimized for *
CPU

Model description
This model uses LSTM trained on Sentiment140 dataset. It achieves 68% accuracy on our test set.

* Please note that it may take a few minutes before your upload is propagated

CANCEL    UPLOAD

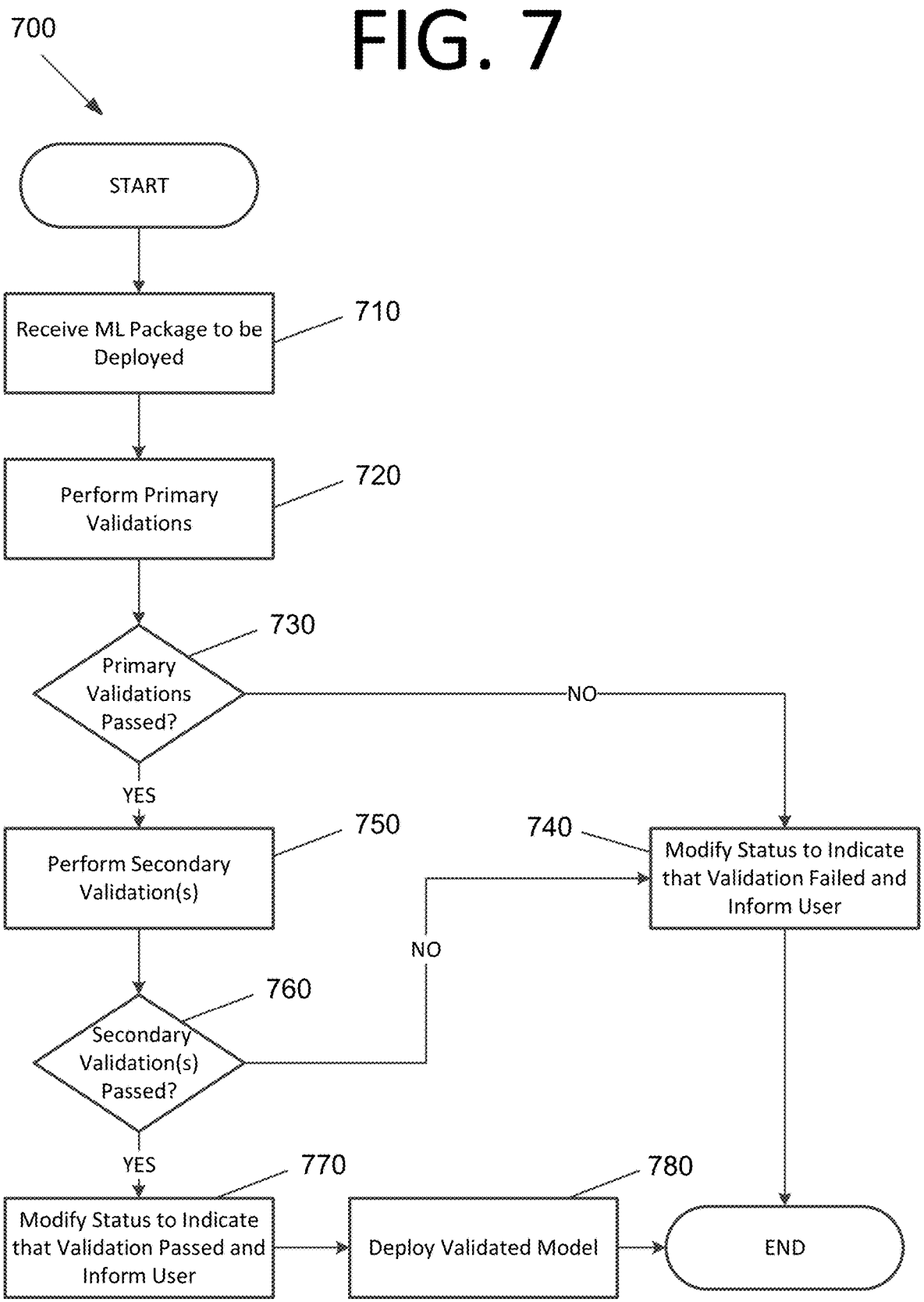

CENTRALIZED PLATFORM FOR VALIDATION OF MACHINE LEARNING MODELS FOR ROBOTIC PROCESS AUTOMATION BEFORE DEPLOYMENT

CROSS REFERENCE TO RELATED APPLICATION

This application claims the benefit of Indian Patent Application No. 201911041727 filed Oct. 15, 2019. The subject matter of this earlier filed application is hereby incorporated by reference in its entirety.

FIELD

The present invention generally relates to robotic process automation (RPA), and more specifically, to a centralized platform for validation of machine learning (ML) models for RPA before deployment.

BACKGROUND

RPA has been used to facilitate the proliferation of software automation due to its execution of relatively simple, repeatable tasks that exist in large numbers within an enterprise. For steps that are difficult to define, have high variability, and require a probabilistic approach, ML may be beneficial. However, ML lacks a sufficient operationalization vehicle in existing RPA systems.

UiPath's AI Fabric™ framework allows customers to integrate third party models or their own custom models into an RPA workflow. However, the possibility exists that malware or some other malicious code may be present in these models, which are non-native. Currently, no solutions exist for this problem. Accordingly, techniques for mitigating such potential threats may be beneficial.

SUMMARY

Certain embodiments of the present invention may provide solutions to the problems and needs in the art that have not yet been fully identified, appreciated, or solved by current RPA technologies. For example, some embodiments of the present invention pertain to a centralized platform for validation of ML models for RPA before deployment.

In an embodiment, a computer program is embodied on a non-transitory computer-readable medium. The program is configured to cause at least one processor to receive an ML package to be deployed in an RPA system. The ML package includes an ML model. The program is also configured to cause the at least one processor to perform primary validations on the ML package to determine whether contents of the ML package comply with requirements for an ML model in the ML package to be deployed in the RPA system. When the primary validations succeed, the program is further configured to cause the at least one processor to perform at least one secondary validation on the ML package to determine whether malicious code is present in the ML package. When the at least one secondary validation succeeds, the program is additionally configured to cause the at least one processor to deploy the ML model to the RPA system.

In another embodiment, a computer-implemented method includes performing, by a conductor application, primary validations on an ML package to be deployed in an RPA system. The primary validations determine whether contents of the ML package comply with requirements for an ML model in the ML package to be deployed in the RPA system. When the primary validations succeed, the computer-implemented method also includes performing at least one secondary validation on the ML package, by the conductor application, to determine whether malicious code is present in the ML package. When the at least one secondary validation succeeds, the computer-implemented method further includes deploying the ML model to the RPA system, by the conductor application.

In yet another embodiment, a system includes memory storing computer program instructions and at least one processor configured to execute the stored computer program instructions. The instructions are configured to cause the at least one processor to receive an ML package to be deployed in an RPA system. The ML package includes an ML model. The instructions are also configured to cause the at least one processor to perform primary validations on the ML package to determine whether contents of the ML package comply with requirements for an ML model in the ML package to be deployed in the RPA system. When the primary validations succeed, the instructions are further configured to cause the at least one processor to perform at least one secondary validation on the ML package to determine whether malicious code is present in the ML package. When the at least one secondary validation succeeds, the instructions are additionally configured to cause the at least one processor to deploy the ML model to the RPA system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 6 is a screenshot illustrating an ML packages page of UiPath Orchestrator™, according to an embodiment of the present invention.

FIG. 7 is a flowchart illustrating a process for validating ML models before deployment in an RPA system, according to an embodiment of the present invention.

DETAILED DESCRIPTION OF THE EMBODIMENTS

Some embodiments pertain to validation of ML models for RPA before deployment. In some embodiments, the validation platform supports multiple programming languages and build platforms in a single centralized platform. The platform in some embodiments may allow the user to upload the model in a predefined package structure. As used herein, a "package" includes the model and its dependencies. The platform may then validate the package for deployment.

In some embodiments, multiple stages of validation may be performed. For instance, in some embodiments, primary validation(s) and secondary validation(s) may be performed. Primary validations may include, but are not limited to, verifying that a single parent folder contains the model contents, verifying that a naming requirements file is included that defines required dependencies, and/or ensuring that the starting class or the main class contains predefined methods/functions, such as predict methods and initialize methods. Secondary validations may include, but are not limited to, executing analysis software, such as that provided by ReversingLabs® or ClamAV®, to identify and block malicious code from being uploaded to the validation platform and infecting infrastructure and/or other customer models.

Figure 1:
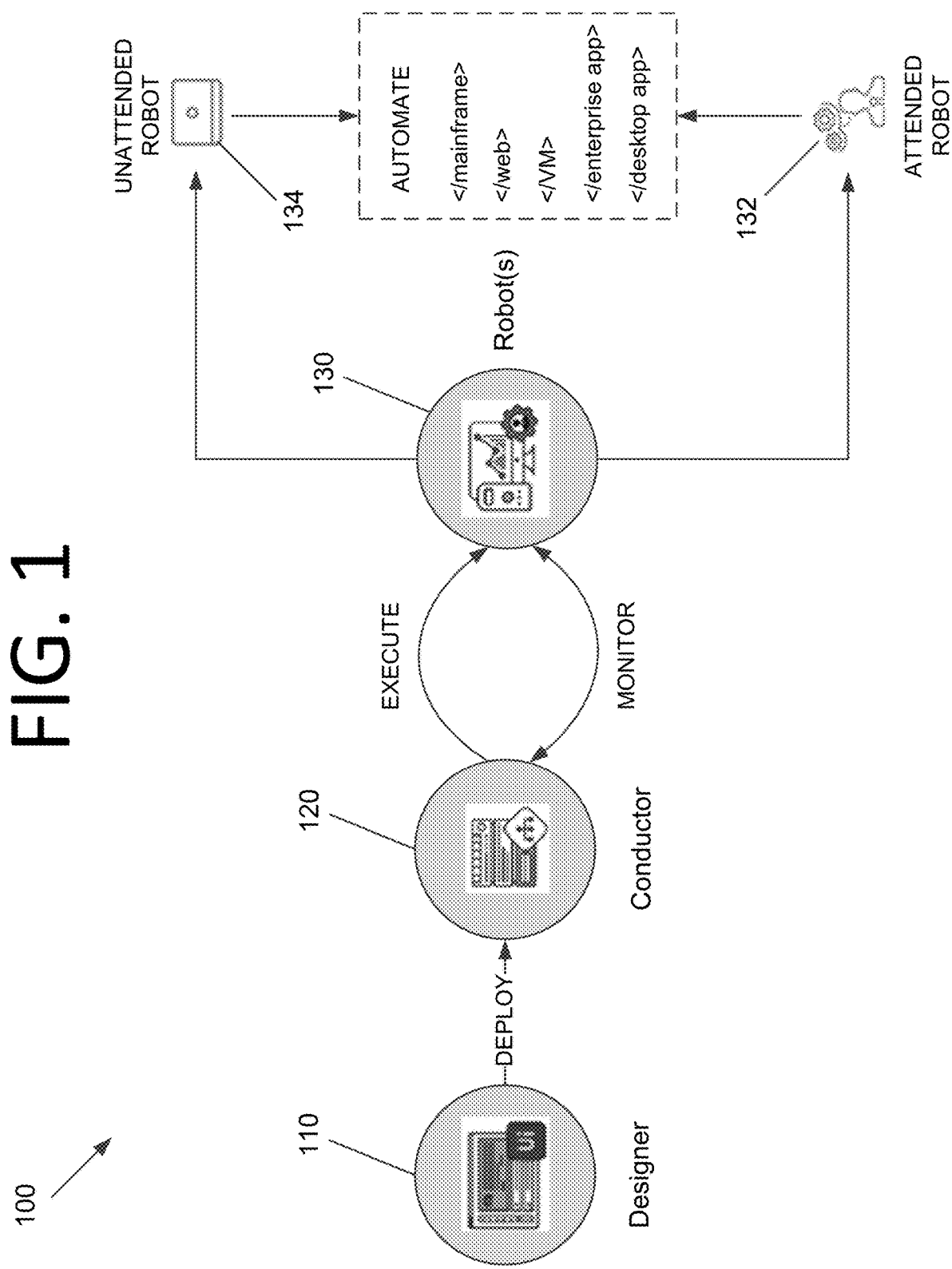
FIG. 1 is an architectural diagram illustrating an RPA system, according to an embodiment of the present invention.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
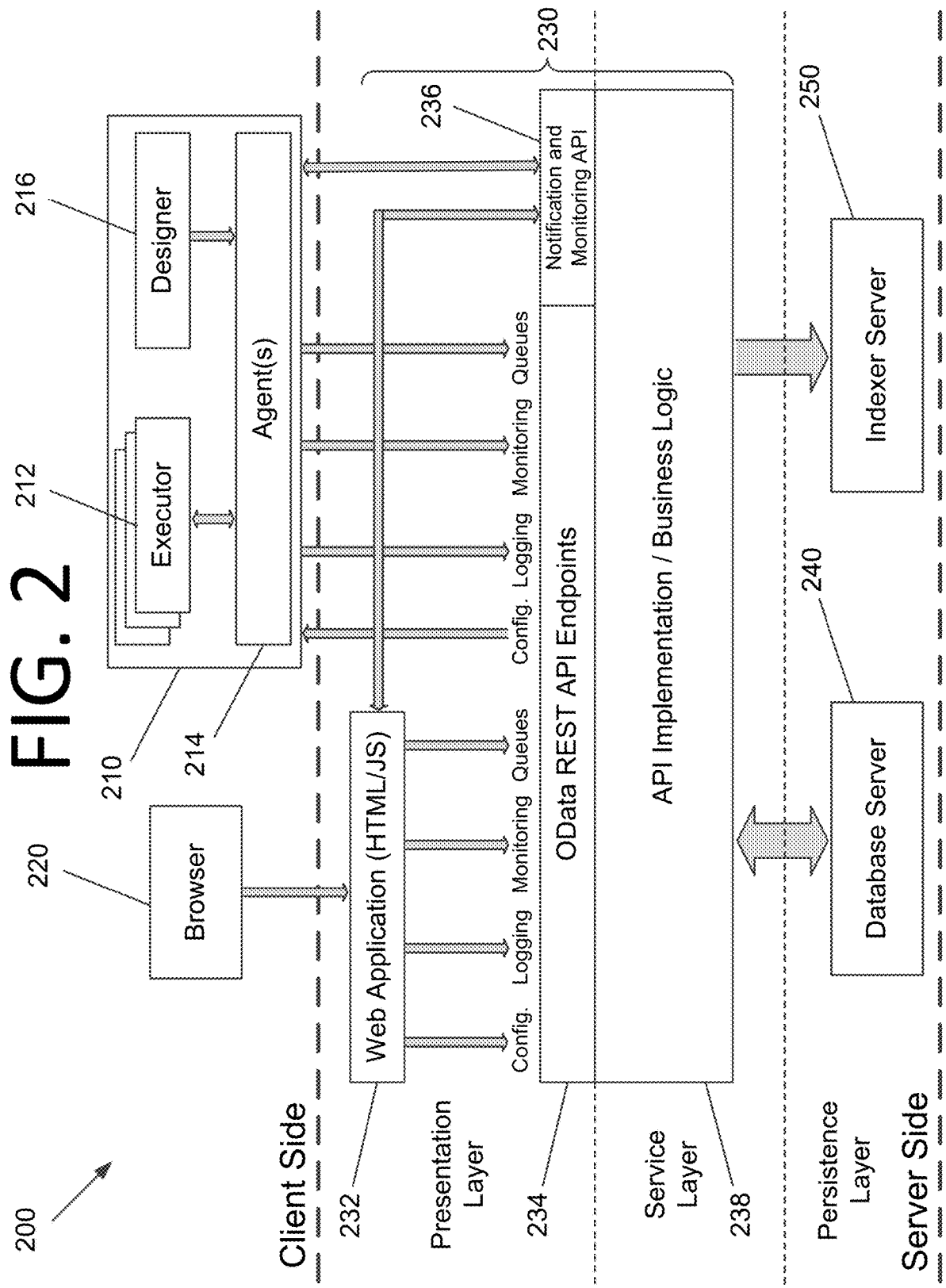
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
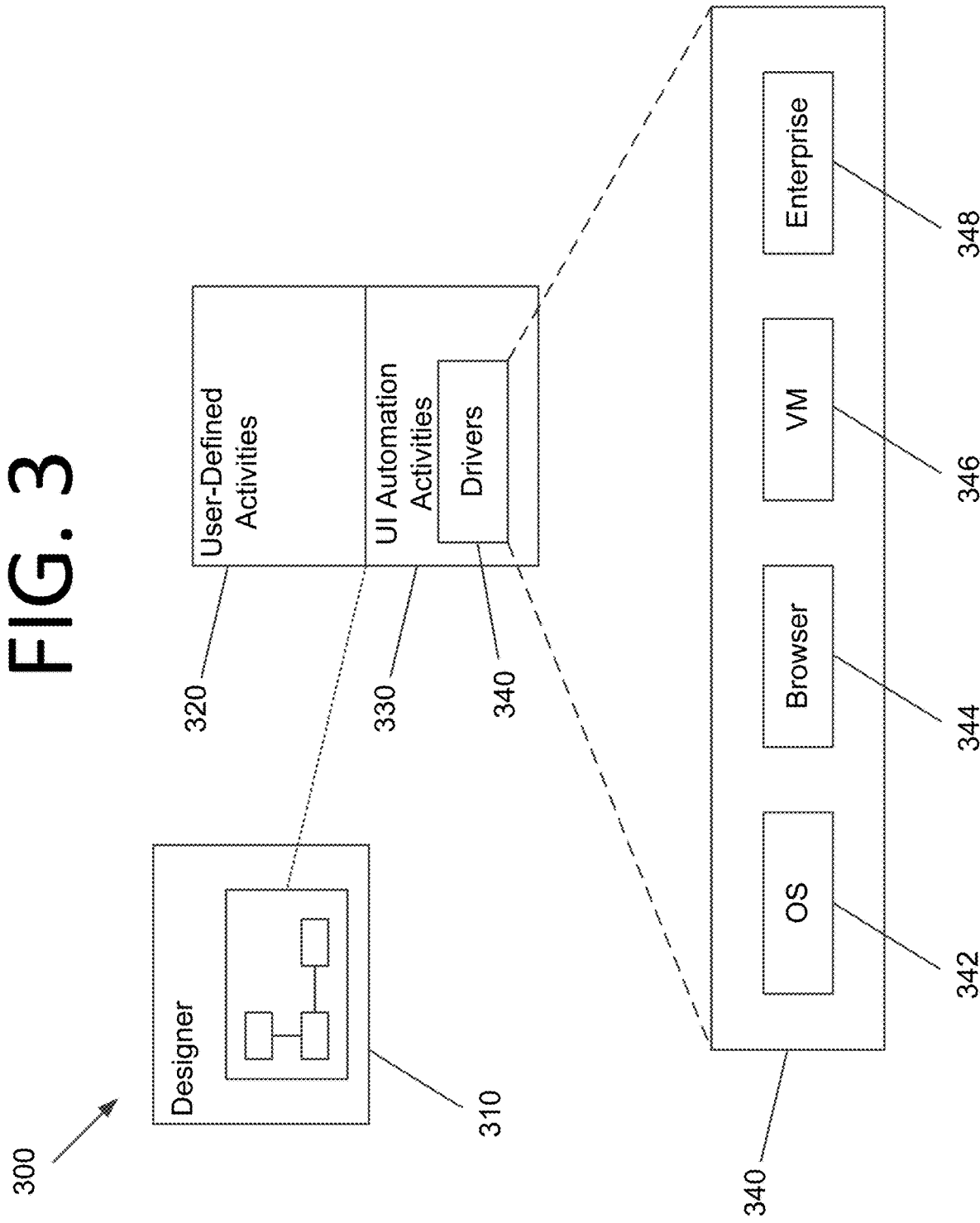
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
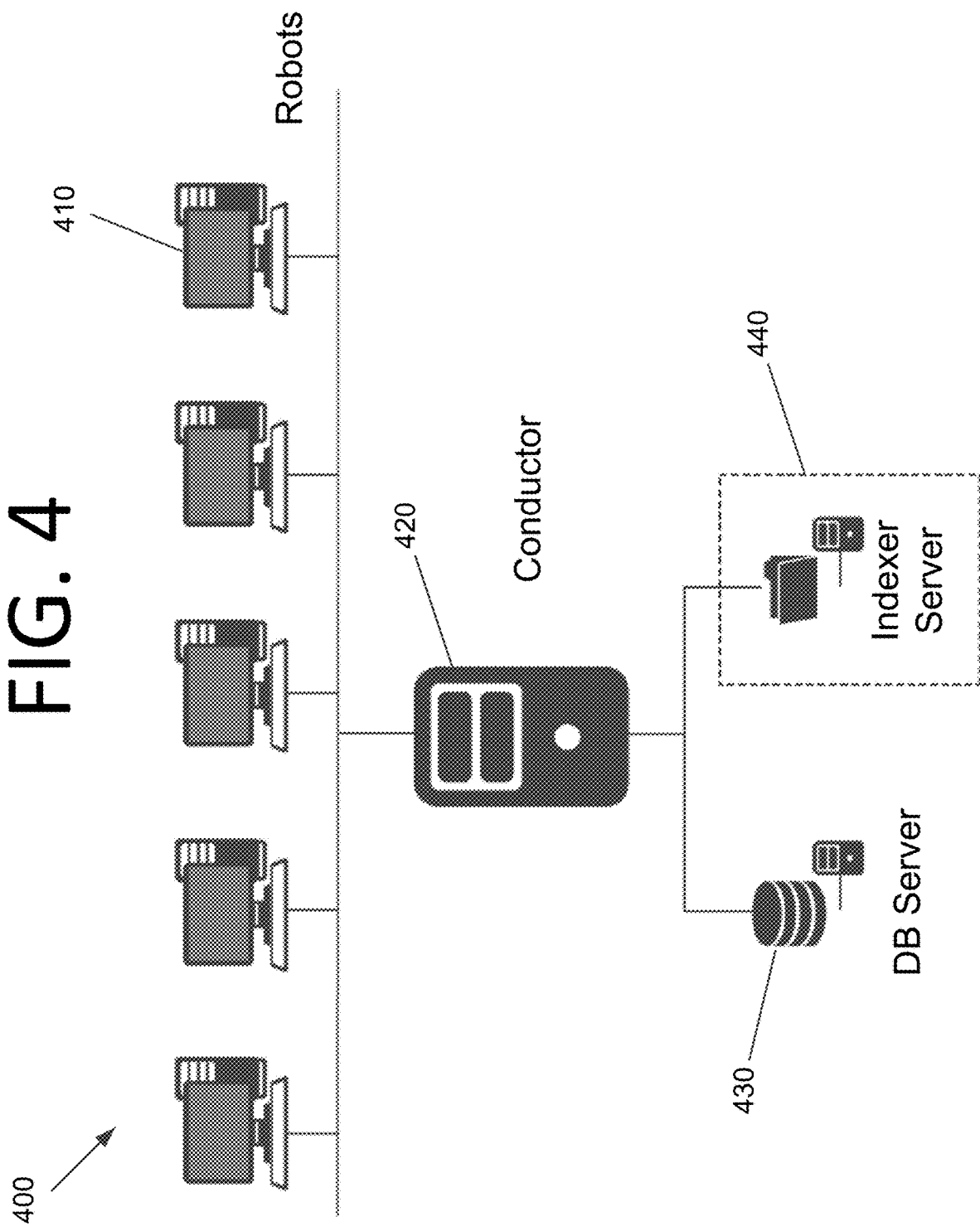
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
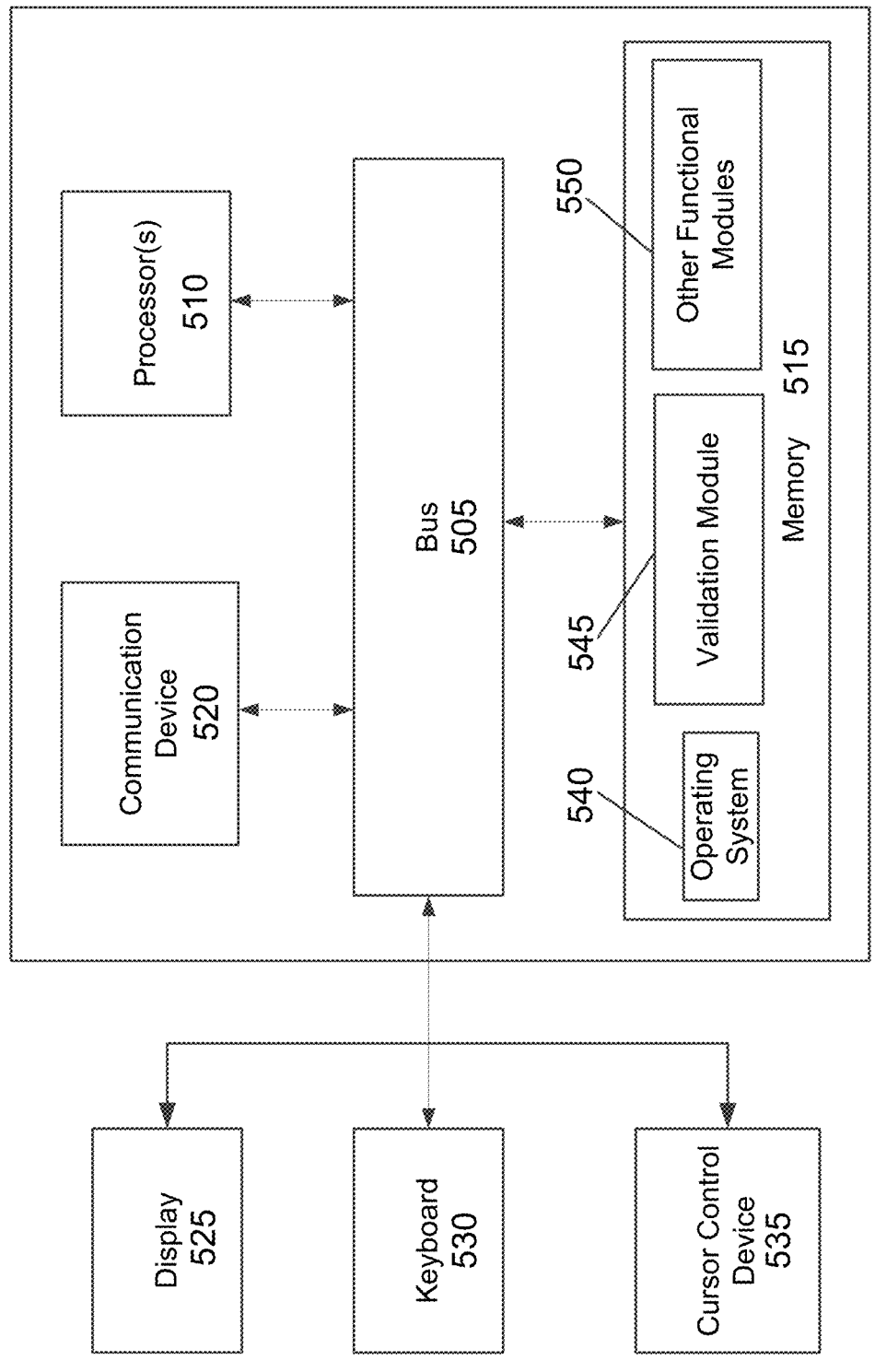
FIG. 5 is an architectural diagram illustrating a computing system configured to validate ML models for RPA before deployment, according to an embodiment of the present invention.

FIG. 5 is an architectural diagram illustrating a computing system 500 configured to validate ML models for RPA before deployment, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a validation module 545 that is configured to perform all or part of the validation processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Per the above, a single centralized validation platform may support multiple programming languages and build platforms. In some embodiments, the user is provided with a package structure that includes guidelines for uploading an ML package. The user may select the build platform and upload the model in a predefined structure to the validation platform. In some embodiments, supported build platforms may include, but are not limited to, Python 2.7, Python 3.6, Python 3.7, Mojo (based on Java), R, etc. Thus, in some embodiments, multiple build platforms can be validated in the same validation platform.

An example structure for the Python ML package is provided below.

```
--|ModelFolder
--|-- main.py
--|-- class Main(object)
--|-- def _init_(self)
--|//code
--|
--|-- def predict(self, input_data, *kwargs)
--|//code
--|-- requirements.txt
--|-- //other dependent files
```

Similar structures may be provided for other build platforms in some embodiments.

Once the model is validated, the status of the ML package may be changed to indicate that the package is ready for deployment (e.g., including the status "UNDEPLOYED"). If validation fails, the status of the ML package may be changed to indicate that failure occurred (e.g., including the status "VALIDATION_FAILED"). The platform may then prevent deployment of the failed package (e.g., the model is not deployed by the conductor).

Example Implementation

The user may begin with creating a zip file containing a single folder with the trained model and the local resources and code (e.g., Python code) required to run the model predictions. Using Python as an example, at the root of this folder, a file named "main.py" may be added. In this file, a class called "Main" may be defined that implements at least the functions _init_(self) and predict(self, input). _init_(self)

takes no arguments in this embodiment and preloads the model and/or local data. predict(self, input) applies a data pipeline as the input and returns a JavaScript Object Notation (JSON) string with the final output of the model.

In some embodiments, the input of the predict function may be a String (in that case, "JSON" may be selected as the input type), a file (in that case, "file" may be selected as the input type), or a list of files (in that case, "list of files" may be selected as the input type). If the user is working with other types, these may be accommodated as well in some embodiments. In certain embodiments, a requirements.txt file with the dependencies to run the model is added at the root of the model (the dependencies may be installed on the server side using pip).

Building Zip File

Consider the example where the user has a model that takes text as input and returns a sentiment prediction for this text along with a confidence score as an output. The project tree may be as follows. However, it should be noted that the folder may be substantially different at this stage in some embodiments.

SentimentAnalysis
- models
-- _init_.py
-- data_transformer.joblib
-- sentiment_analyzer.joblib
- resources
-- _init_.py
-- data_used_during_runtime.json
-- _init_.py
-- mycode.py The user may then add two new files to the directory. In this example, "main.py" is as follows:

```
import joblib
import json
class Main:
    def _init_(self):
        self.folder_model='./models/'
        self.folder_data='./resources/'
        #preload models and data so reload not needed for each
            prediction
        self.preprocesser=joblib.load(self.folder_model+
            'data_transformer.joblib')
        self.predictor=joblib.load(self.folder_model+'senti-
            ment_analyzer.joblib')
        with open(folder_data+'data_used_during_runtime.j-
            son') as f: self.aux_data=json.load(f)
    def predict(self, text):
        #execute all preprocessing
        processed_data=self.preprocesser(text)
        if processed_data['lang'] in self.aux_data['accepted_
            lang']:
            dict_result=self.predictor(processed_data)
            return json.dumps(dict_result)
        #if the lang is not treated return default value
        return json.dumps({'sentiment':'neutral', 'confidence':
            0.})
```

A requirements file (e.g., "requirements.txt") may include the following:

numpy==1.15.4
nltk==3.3.0
joblib
pandas>=0.23.1

The tree for the new content may be:
Zip name: SentimentAnalysis.zip
Zip Content:
SentimentAnalysis
- models
-- _init_.py
-- data_transformer.joblib
-- sentiment_analyzer.joblib
- resources
-- _init_.py
-- data_used_during_runtime.json
-- _init_.py
-- mycode.py
-- main.py
-- requirements.txt Uploading Model to Conductor In order to upload the package, the user may go to the conductor instance (in this example, UiPath Orchestrator™) and navigate to the ML packages page (go first to "ML Skill" and then click on "ML Packages"). A screenshot of an ML packages page 600 is shown in FIG. 6. Here, SentimentAnalysis.zip has been chosen for upload with the model name TheBestSentimentAnalyzer, "json" as the input type description, a string of text to analyze, an output description, Python 3.x as the language, CPU as what the model is optimized for, and a model description.

Handling Different Types of Data

Various types of input may be passed from a robot to the ML skill. Some sample code for different input types is provided below.

Input Model is a File

If the input model is a file, the user may select the "file" input type before uploading the model. The input should be converted on the Python side. The robots may send a base64 string representation of the file, but the encoding and decoding of the file may occur on the conductor side. An example is included below:

```
#import base64 library
import base64
#other imports
class Main:
    def _init_(self):
        #init code
    def predict(self, my_file):
        #use my_file in predict code
```

The RPA developer should understand what file to provide from the input description field and the types that the model works with. A path to the file should also be provided.

Input Model is a List of Files

If the input model is a list of files, the user may select the "list of files" input type before uploading the model. The input should be converted on the Python side. The robots may send a base64 string representation of the file, but the encoding and decoding of the file may occur on the conductor side. An example is included below:

```
#import base64 library
import base64
#other imports
class Main:
    def _init_(self):
        #init code
    def predict(self, my_files_list):
        #use my_files_list in predict code
```

The RPA developer should understand what file to provide from the input description field and the types that the model works with. The RPA developer should also be informed whether the files need to be provided in specific order. A string with paths to the files separated by commas should be provided.

Input Model is a List or a Dictionary (Dict)

If the input model is a list or dict structure, the user may select the "json" input type before uploading the model. The input should be converted on the Python side. The variables should be sent to the ML Skill as a JSON string. For example, for a list "[1, 2, 3, 4]" and for a dict "{"key1": value1, "key2":value2}". This may be handled as follows.

```
#import json library
import json
#other imports
class Main:
    def _init_(self):
        #init code
    def predict(self, input_json):
        #input_json="[1, 2, 3, 4]"
        input=json.loads(input_json)
        #input=[1, 2, 3, 4]
        #rest of predict code
```

The RPA developer should understand what data to provide from the input description field. It is also a good practice to provide sample data so the RPA developer can readily understand what the input should look like (i.e., the schema). To see what the input schema looks like in JSON, one can run the command json.dumps(my_sample) in a Python console and copy paste the result. This should be a string containing the data.

Input Model is a Numpy Array

If the input model is a numpy array structure, the user may select the "json" input type before uploading the model. The input should be converted on the Python side. The variable may be sent to the ML Skill as a JSON string containing a list, so it is similar to the list/dict example, except for the transformation to a numpy array. This may be handled as follows.

```
#import json and numpy library
import json
import numpy as np
#other imports
class Main:
    def _init_(self):
        #init code
    def predict(self, input_json):
        input_list=json.loads(input_json)
        input=np.array(input_list)
        #rest of predict code
```

The input description field should inform the RPA developer will understand what data to provide. It is also a good practice to provide sample data so the developer can readily understand what the input should look like. To see how the input data looks in JSON, one can run the command json.dumps(my_sample_array.tolist()) in a Python console and copy/paste the result. This should be a string containing the array as a list.

Input Model is a Pandas Dataframe/Series

If the input model is a pandas DataFrame/Series, the user may select the "json" input type before uploading the model. The input should be converted on the Python side. The variable may be sent to the ML Skill as a JSON string, and the read_json function provided by pandas may then be used:

```
#import pandas library
import pandas
#other imports
class Main:
    def _init_(self):
        #init code
    def predict(self, input_json):
        input_list=pd.read_json(input_json, orient='records')
        #a different orient may be used here for consistency
        #rest of predict code
```

The input description field should inform the RPA developer will understand what data to provide. It is also a good practice to provide sample data so the developer can readily understand what the input should look like. To see how the input data looks in JSON, one can run the command my_df.to_json(orient='records') in a Python console and copy paste the result. It should appear similar to a list of dict.

Working with Tensorflow (TF) Graph

Because multiple threads may be used to serve the model in some embodiments, if a TF graph is used, it should load on the same thread that is used for serving. One way to achieve this is to modify the code as follows:

```
#all imports
class Main:
    def _init_(self):
        #add this line
        self.graph=tf.get_default_graph()
        #rest of init code here
    def predict(self, input):
        #beginning of predict code
        #add this line
        with self.graph.as_default():
            #call predict function here
            pred_arr=self.model.predict(example)
        #rest of predict code
```

Validation Process

FIG. 7 is a flowchart illustrating a process 700 for validating ML models before deployment in an RPA system, according to an embodiment of the present invention. The process begins with a conductor application receiving an ML package to be deployed at 710. The ML package includes parameter settings and an ML model. Using the parameter settings, the conductor application then performs primary validations on the ML package at 720 using the parameter settings. In some embodiments, the primary validations may include, but are not limited to, verifying that a single parent folder contains the model contents, verifying that a naming requirements file is included that defines required dependencies, and/or ensuring that the starting class or the main class contains predefined methods/functions, such as predict methods and initialize methods. In some embodiments, the input to the model may be a string, a file, a list of files, a list or dict structure, a numpy array, a pandas DataFrame/Series, a TF graph, or any other suitable input type without deviating from the scope of the invention.

In some embodiments, multiple programming languages and build platforms may be supported, and a package structure including guidelines for uploading an ML package may be provided. Supported build platforms may include, but are not limited to, Python 2.7, Python 3.6, Python 3.7, Mojo (based on Java), R, etc. In certain embodiments, the model folder includes a main class, required predefined methods/functions, and a requirements file that lists other dependent files. In some embodiments, the ML package may be a zip file.

If at least one of the primary validations failed at 730, the status of the ML package is changed to indicate that validation failure occurred (e.g., including the status "VALIDATION_FAILED") and the user is informed of the failure via the conductor at 740. If the primary validations succeeded, however, secondary validation(s) are performed at 750 to identify whether malicious code is present in the ML package. The secondary validation(s) may include, but are not limited to, executing one or more analysis software applications to identify whether malicious code is present. If such malicious code is present at 760, the status of the ML package is changed to indicate that the package failure occurred (e.g., including the status "THREAT_DETECTED") and the user is informed of the failure via the conductor at 740. The ML model will not be deployed in this case.

If, however, the secondary validation(s) passed at 760, the status of the ML package is changed to indicate that validation succeeded (e.g., including the status "UNDEPLOYED") and the user is informed of successful validation via the conductor at 770. The validated model is then deployed at 780. It should be noted that process 700 of FIG. 7 may be performed for any desired number of ML models.

The process steps performed in FIG. 7 may be performed by a computer program, encoding instructions for the processor(s) to perform at least part of the process(es) described in FIG. 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable medium storing a computer program, the computer program configured to cause at least one processor to:
receive a machine learning (ML) package to be deployed in a robotic process automation (RPA) system, the ML package comprising an ML model; and
perform primary validations on the ML package to determine whether contents of the ML package comply with requirements for an ML model in the ML package to be deployed in the RPA system.

2. The non-transitory computer-readable medium of claim 1, wherein the primary validations comprise verifying that a single parent folder in the ML package contains contents of the ML model, verifying that the ML package comprises a naming requirements file that defines required dependencies, ensuring that a starting class or a main class contains predefined methods or functions, or any combination thereof.

3. The non-transitory computer-readable medium of claim 1, wherein the primary validations comprise ensuring that a starting class or a main class comprise predict methods and initialize methods.

4. The non-transitory computer-readable medium of claim 1, wherein input to the ML model comprises a string, a file, a list of files, a list or dict structure, a numpy array, a dataframe, or a series.

5. The non-transitory computer-readable medium of claim 1, wherein the program is configured to support multiple programming languages, multiple build platforms, or both.

6. The non-transitory computer-readable medium of claim 1, wherein the ML package comprises a model folder, the model folder comprising a main class, predefined methods or functions, and a requirements file that lists other dependent files.

7. The non-transitory computer-readable medium of claim 1, wherein when at least one of the primary validations fails, the computer program is further configured to cause the at least one processor to:
 change a status of the ML package to indicate that primary validation failure occurred and display an indication of the primary validation failure.

8. The non-transitory computer-readable medium of claim 1, wherein when the at least one primary validation succeeds, the computer program is further configured to cause the at least one processor to:
 perform at least one secondary validation on the ML package to determine whether malicious code is present in the ML package; and
 when the at least one secondary validation succeeds, deploy the ML model to the RPA system.

9. The non-transitory computer-readable medium non-transitory computer-readable medium of claim 8, wherein when the at least one secondary validation fails, the computer program is further configured to cause the at least one processor to:
 change a status of the ML package to indicate that secondary validation failure occurred and display an indication of the secondary validation failure.

10. The non-transitory computer-readable medium of claim 1, wherein the computer program requires a predetermined package structure for the primary validations.

11. A computer-implemented method, comprising:
 performing, by a conductor application, primary validations on a machine learning (ML) package to be deployed in a robotic process automation (RPA) system, the primary validations determining whether contents of the ML package comply with requirements for an ML model in the ML package to be deployed in the RPA system.

12. The computer-implemented method of claim 11, wherein the primary validations comprise verifying that a single parent folder in the ML package contains contents of the ML model, verifying that the ML package comprises a naming requirements file that defines required dependencies, ensuring that a starting class or a main class contains predefined methods or functions, or any combination thereof.

13. The computer-implemented method of claim 11, wherein the primary validations comprise ensuring that a starting class or a main class comprise predict methods and initialize methods.

14. The computer-implemented method of claim 11, wherein input to the ML model comprises a string, a file, a list of files, a list or dict structure, a numpy array, a dataframe, or a series.

15. The computer-implemented method of claim 11, wherein the ML package comprises a model folder, the model folder comprising a main class, predefined methods or functions, and a requirements file that lists other dependent files.

16. The computer-implemented method of claim 11, wherein when at least one of the primary validations fails, the method further comprises:
 changing a status of the ML package to indicate that primary validation failure occurred and displaying an indication of the primary validation failure, by the conductor application.

17. The computer-implemented method of claim 11, wherein when the primary validations succeed, the method further comprises:
 performing at least one secondary validation on the ML package, by the conductor application, to determine whether malicious code is present in the ML package; and
 when the at least one secondary validation succeeds, deploying the ML model to the RPA system, by the conductor application.

18. The computer-implemented method of claim 17, wherein when the at least one secondary validation fails, the method further comprises:
 changing a status of the ML package to indicate that secondary validation failure occurred and displaying an indication of the secondary validation failure, by the conductor application.

19. A system, comprising:
 memory storing computer program instructions; and
 at least one processor configured to execute the stored computer program instructions, wherein the computer program instructions are configured to cause the at least one processor to:
  receive a machine learning (ML) package to be deployed in a robotic process automation (RPA) system, the ML package comprising an ML model; and
  perform primary validations on the ML package to determine whether contents of the ML package comply with requirements for an ML model in the ML package to be deployed in the RPA system.

20. The system of claim 19, wherein the primary validations comprise verifying that a single parent folder in the ML package contains contents of the ML model, verifying that the ML package comprises a naming requirements file that defines required dependencies, ensuring that a starting class or a main class contains predefined methods or functions, or any combination thereof.

21. The system of claim 19, wherein the primary validations comprise ensuring that a starting class or a main class comprise predict methods and initialize methods.

22. The system of claim 19, wherein the ML package comprises a model folder, the model folder comprising a main class, predefined methods or functions, and a requirements file that lists other dependent files.

23. The system of claim 19, wherein when the at least one primary validation succeeds, the computer program instructions are further configured to cause the at least one processor to:
 perform at least one secondary validation on the ML package to determine whether malicious code is present in the ML package; and
 when the at least one secondary validation succeeds, deploy the ML model to the RPA system.

* * * * *